Aug. 15, 1939.   J. H. WILSON   2,169,780
TRANSMISSION INTERLOCK
Filed Jan. 2, 1937   3 Sheets—Sheet 1
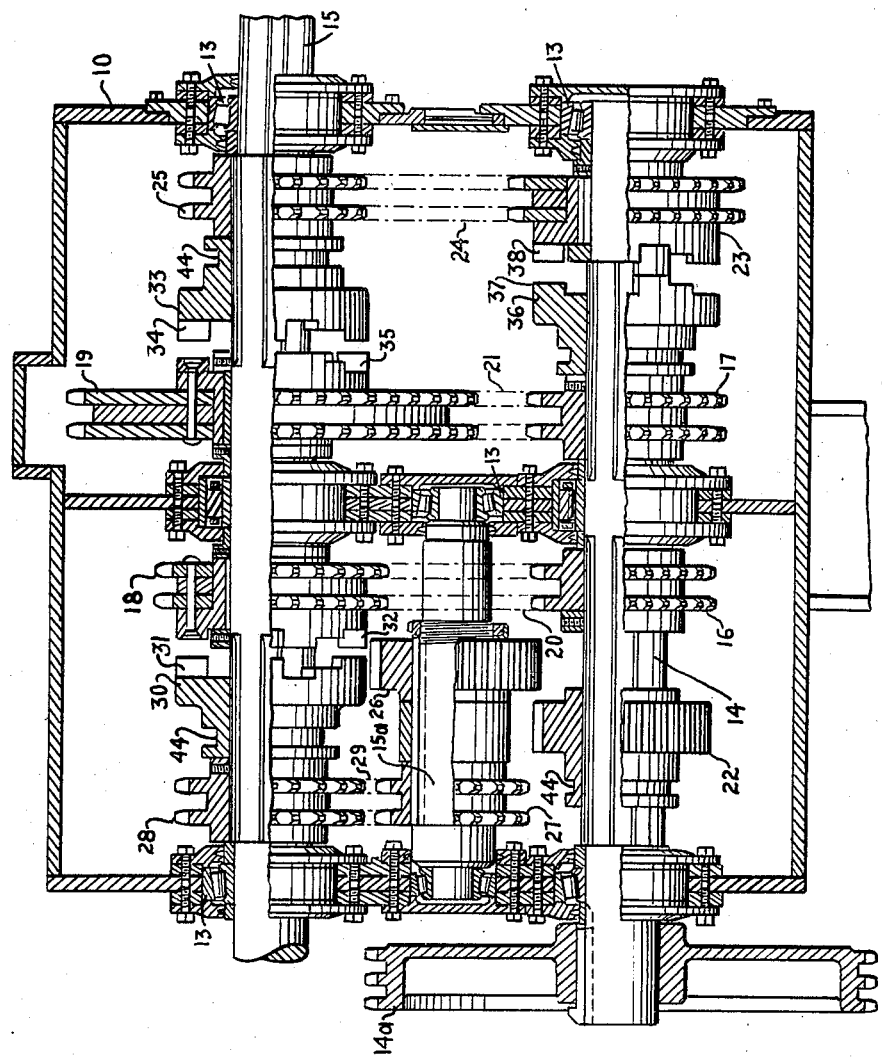
Inventor
JOHN H WILSON

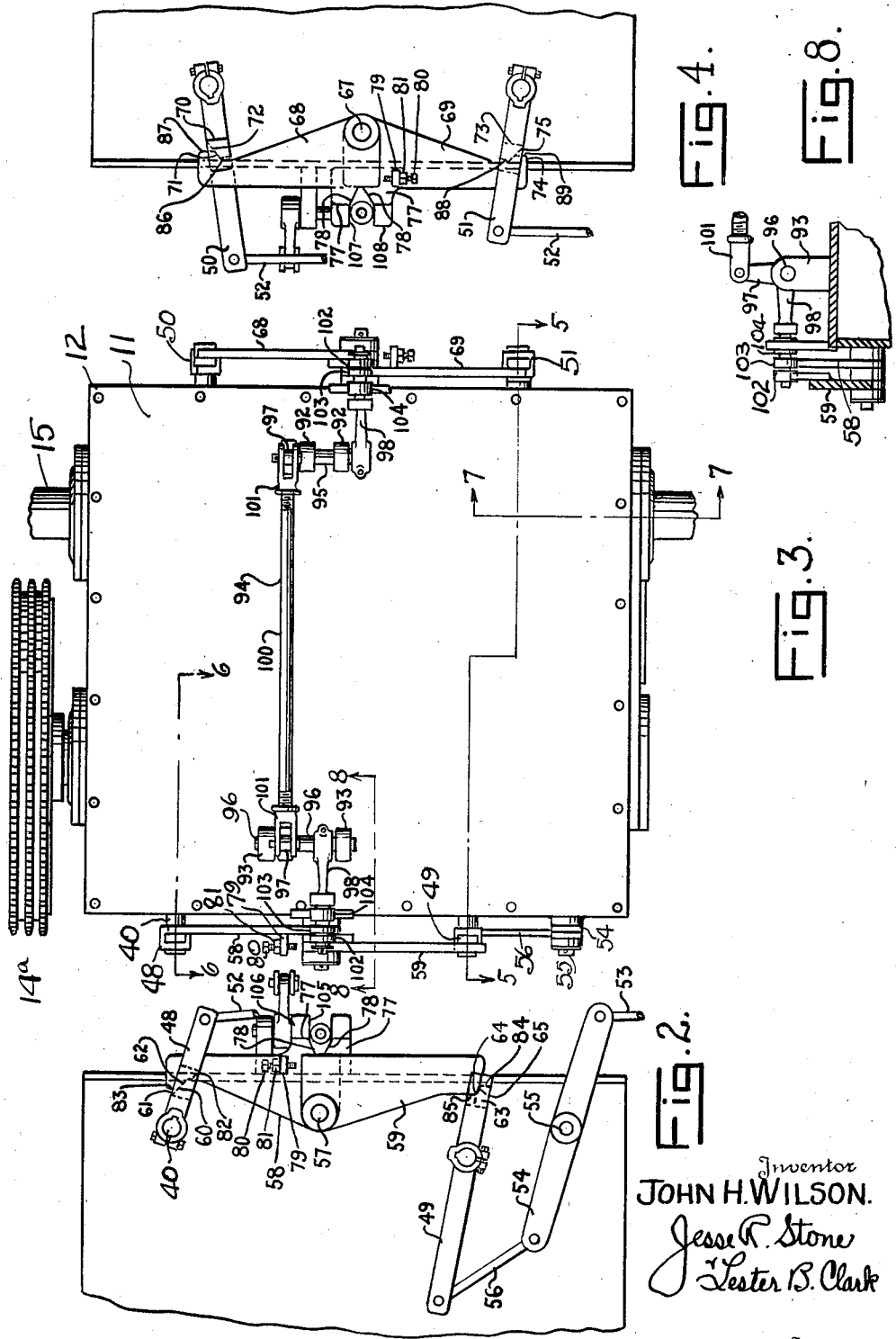

Aug. 15, 1939.  J. H. WILSON  2,169,780
TRANSMISSION INTERLOCK
Filed Jan. 2, 1937   3 Sheets-Sheet 3

Inventor
JOHN H. WILSON
Jesse R. Stone
Lester B. Clark

By

Attorneys

Patented Aug. 15, 1939

2,169,780

UNITED STATES PATENT OFFICE 2,169,780

TRANSMISSION INTERLOCK

John Hart Wilson, Wichita Falls, Tex.

Application January 2, 1937, Serial No. 118,821

8 Claims. (Cl. 74—477)

This invention relates to shifting mechanisms for change speed devices, and is particularly concerned with an interlock mechanism for preventing the establishment of more than one driving connection at a time.

It is an object of this invention to provide an interlock mechanism which can readily be assembled and disassembled for repair.

It is a further object of this invention to provide an interlock mechanism having a positive locking action.

It is a further object of this invention to provide an interlock mechanism which can be mounted on the exterior of a change speed mechanism for ready inspection and adjustment.

It is a further object of this invention to provide an interlock mechanism of sturdy and durable construction.

It is a further object of this invention to provide an interlock mechanism which can be advantageously employed with shifting levers at opposite sides of a change speed mechanism.

Other objects relating to economy of manufacture and to details of construction will hereinafter appear.

The invention will best be understood from the description of one practical embodiment illustrated in the accompanying drawings, in which Fig. 1 is a top plan view of a change speed device with the upper portion of the housing broken away and with the gears, bearings and clutches shown partly in section.

Fig. 2 is a fragmentary side elevational view of the change speed device.

Fig. 3 is a top plan view of the change speed device.

Fig. 4 is a side elevational view of the change speed device showing the opposite side to that shown in Fig. 2.

Fig. 8 is a fragmentary sectional view of the change speed mechanism taken on line 8—8 of Fig. 3, the view showing a portion of the interlock mechanism in side elevation.

Figure 5:
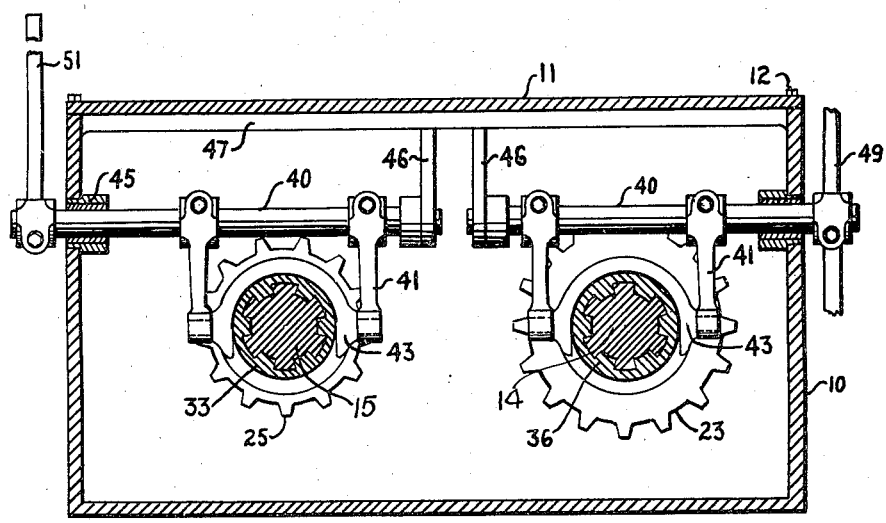
Fig. 5 is a sectional view of the change speed device taken on line 5—5 of Fig. 3.
Figures 6, 7:
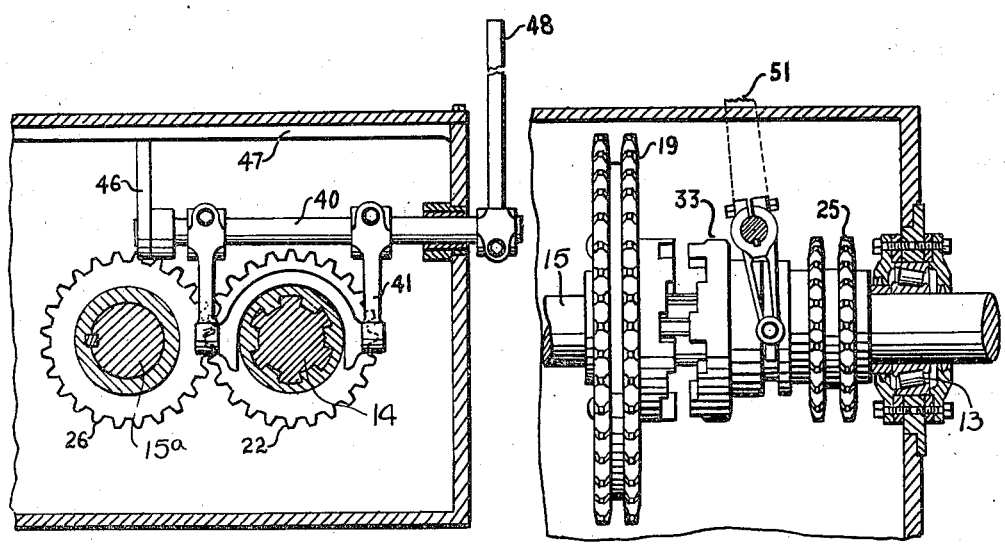
Fig. 6 is a fragmentary sectional view of the change speed device taken on line 6—6 of Fig. 3.
Fig. 7 is a fragmentary sectional view of the change speed device taken on line 7—7 of Fig. 3.

The change speed device illustrated in the drawings comprises a casing 10 equipped with a removable cover 11 held in place by screws 12. Rotatably mounted within the casing 10 by means of roller bearings 13 there are three shafts, a drive shaft 14 equipped with a driving sprocket 14a, a driven shaft 15, and a stub shaft 15a.

The driving shaft 14 has rigidly affixed thereon two sprocket wheels 16 and 17 which drive two sprockets 18 and 19 rotatably mounted upon the driven shaft 15 by means of two chains 20 and 21 indicated in the drawings by dot and dash lines. In addition to the sprockets 16 and 17, the driving shaft 14 supports a slidably mounted gear 22, which is employed to establish a reverse driving connection as hereinafter described, and a rotatably mounted sprocket wheel 23 connected by means of chains 24 with a sprocket wheel 25 fixed on the shaft 15.

The sprocket wheels 17 and 19 constitute the low or the first speed gears of the transmission, the sprocket wheels 16 and 18 the intermediate or the second speed gears, the sprocket wheels 23 and 25 the high or third speed gears.

The reversing mechanism previously referred to comprises, in addition to the gear 22, a gear 26 fixed upon the shaft 15a and designed to mesh with the gear 22 when the gear 22 is moved to the right from the position illustrated in Fig. 1, a sprocket wheel 27 fixed on the shaft 15a in spaced relation to the gear 26, and a sprocket wheel 28 fixed on the forward end of the driven shaft 15 and connected to the sprocket wheel 27 by chains 29.

Splined upon the shaft 15 between the sprocket wheels 28 and 18 there is a slidable clutch 30 formed with teeth 31 designed to mesh with teeth 32 on the sprocket wheel 18; and splined upon such shaft between the sprocket wheels 19 and 25 there is a second slidably mounted clutch member 33 constructed with teeth 34 designed for engagement with teeth 35 on the sprocket wheel 19. The shaft 14 supports a third clutch member 36 which is slidably and non-rotatably mounted upon such shaft between the sprocket wheels 17 and 23 and which is formed with teeth 37 designed for engagement with teeth 38 on the sprocket wheel 23.

Assuming that the clutches 30, 33 and 36 and the gear 22 occupy the positions shown in Fig. 1, three forward speeds and a single reverse speed are obtained as follows:

First speed or low speed, by moving the clutch 33 to the left to bring its teeth 34 in engagement with the teeth 35 on the sprocket wheel 19, the drive being transmitted from the sprocket wheel 17 through the chains 21 to the sprocket wheel 19 and the shaft 15;

Second or intermediate speed, by moving the clutch 30 to the right to bring its teeth 31 in engagement with the teeth 32 on the sprocket wheel 18, the drive being transmitted from the sprocket wheel 16 through the chains 20 to the sprocket wheel 18 and the shaft 15;

Third or high speed, by moving the clutch 36 to the right to bring its teeth 37 in engagement with the teeth 38 on the sprocket wheel 23, the drive from the sprocket wheel 23 being transmitted through the chains 24 to the sprocket wheel 25 and the shaft 15;

Reverse, by moving the gear 22 to the right to bring its gear teeth into mesh with the gear teeth of the gear 26, the drive from the gear 22 being transmitted to the gear 26 and the sprocket wheel 27 and through the chains 29 to the sprocket wheel 28 and the shaft 15.

The clutches 30, 33 and 36 and the gear 22 are actuated by means of similar mechanisms, each comprising a rotatably mounted shaft 40 connected through arms 41 to a yoke 43 designed to fit in a groove 44 in the associated gear or clutch and extending through side walls of the housing 10. The shafts 40 are supported at their outer ends in bearing 45 in the walls of the housing 10, and at their inner ends in bearings formed in the lower ends of arms 46 depending from webs 47. Rigidly fixed on the outer end of the shaft 40 which actuates the gear 22, there is an upwardly extending lever 48, and rigidly fixed on the shafts 40, which are respectively associated with the clutch 36, clutch 30 and clutch 33, there are similar levers 49, 50 and 51. The levers 48, 50 and 51 are actuated by means of pull rods 52 from a remote point, and the lever 49 from the same point by means of a pull rod 53, and a lever 54 pivoted on the housing 10 at 55 and connected to the lever 49 by a link 56.

Pivoted on a pin 57, which extends outward from the left-hand side of the housing 10, as viewed in Fig. 3, there are two levers 58 and 59. The outer end of the lever 58 rests on a lug 60 formed on the lever 48 and is formed with a cam surface 62 which engages with a cam surface 61 formed on the lug 60. The outer end of the lever 59 rests on a lug 63 formed on the lever 49. Lug 63 is formed with an inclined surface 64 arranged for engagement with a cam surface 65 on the lever 59. Mounted at the opposite side of the transmission from the levers 58 and 59 upon a pin 67, there are two levers 68 and 69 of similar appearance to the levers 58 and 59. The lever 68 is supported at its outer end by a lug 70 formed on the lever 50 and is constructed with a cam surface 71 which engages with a cam surface 72 on the lug 70. The lever 69 is similarly supported at its outer end by a lug 73 on the lever 51 and is formed with an inclined cam surface 74 designed to engage with a cam surface 75 on the lug 73.

The levers 58 and 59 and the levers 68 and 69 are constructed with upwardly extending lugs 77 formed with cam surfaces 78 for engagement with the rollers of a mechanism later described. The levers 58 and 69 are, in addition, constructed with lugs 79 which receive adjustable screws 80 designed to engage with the levers 59 and 68 in the manner hereafter explained. The screws 80 as illustrated are equipped with lock nuts 81 to retain them in an adjusted position. The lug 60 is formed with an upper surface 82 which is engaged by a surface 83 on the end of the lever 58 when the lever 48 is moved to shift the gear 22 into mesh with the gear 26, the shoulder 63 with a surface 84 which is engaged by a surface 85 on the end of the lever 59 when the lever 49 is moved to shift the clutch 36 into engagement with the gear 23, the lug 70 with an upper surface 86, which is engaged by a surface 87 on the lever 68, when the lever 50 is moved to shift the clutch 30 into engagement with the gear 18, and the lug 73 with an upper surface 88, which is engaged by a surface 89 on the lever 69 when the lever 51 is moved to shift the clutch 33 into engagement with the gear 19. The surfaces 82 and 83, 84 and 85, 86 and 87, and 88 and 89 are designed for purposes later described so that transmission of force from the levers 58, 59, 68 and 69 to the levers 48, 49, 50 and 51 will not produce turning of the latter levers. This is accomplished by forming the surfaces 82, 84, 86 and 88 perpendicular to their radii of rotation about the pivotal centers of the shifting levers, and by constructing the surfaces 83, 85, 87 and 89 to properly engage therewith.

The plate 11 is constructed with a pair of lugs 92 shown at the right in Fig. 3, and with a second pair of lugs 93 located at the opposite side of the change speed device. These lugs support a link mechanism 94 comprising a pin 95 rotatably mounted in the lugs 92 and a pin 96 rotatably mounted in the lugs 93. Adjustably secured upon each of the pins 95 and 96 there is an upstanding lever 97 and a laterally extending lever 98. Levers 97 are connected for the transmission of movement by a link consisting of a rod 100 and two clevices 101. The levers 98 are each equipped with three rollers 102, 103 and 104. Rollers 102, 103 and 104 of the lever 98, shown at the left in Fig. 3, are designed to engage respectively with the cam surface 78 on the lug 77 on the lever 59, with the cam surface on the lug 77 on the lever 58 and with the sides of a guide slot 105 formed in a member 106 secured to the side of the casing 10. The rollers 102, 103 and 104 of the levers 95 at the opposite side of the change speed device are designed to engage respectively with the cam surface 78 on the lug 77 on the lever 68; with the cam surface 78 on the lug 77 on the lever 69, and with the sides of a guide slot 107 formed in a member 108 secured to the side of the casing 10.

In assembly, the screw 80 carried by the lever 58 is adjusted so that it is moved forward within a few thousandths of an inch of the inner end of the lever 59 when the lever 58 is moved upward by movement of the lever 48 to shift the gear 22 into engagement with the gear 26. Such adjustment in accordance with the manner in which the mechanism is constructed also results in the inner end of the member 59 being moved within a few thousandths of an inch of the end of the screw 80 when such lever is moved upward by movement of the lever 49 to shift the clutch 36 into engagement with the gear 23. A similar adjustment of the screw 80 carried by the lever 69 is made to attain a like clearance between such screw and the inner end of the lever 68 when either the lever 68 or the lever 69 is moved upward by the associated shifting lever 50 or 51 in effecting the establishment of a driving connection. Following the adjustments just described, the mechanism 94 is adjusted with the shifting levers 48, 49, 50 and 51 in inoperative positions as shown to provide a small amount of lost motion between the rollers 102 and 103 and the cam surfaces 78 on the levers 58, 59, 68 and 69. The amount of the lost motion thus provided is made such that movement of either one of the shifting levers at either side of the change speed device will act through the associated locking lever and lug 77 to take up substantially all of the lost motion.

Assuming that the screws 80 and the mechanism 94 have been properly adjusted and that the parts of the device described occupy positions as shown, movement of the lever 48 to shift the gear 22 into mesh with the gear 26 will act through the cam surface 61 to cam the locking lever 58 upward until the lug 60 slides under the outward end of the lever 58. During such movement, the cam surface 78 on the lever 58 will act through engagement with the roller 103 on the associated lever 98 to move such lever upward and through the intermediate portion of the mechanism 94 to move the lever 98 on the opposite side of the change speed device downward. At the termination of the shifting movement of the lever 48, the upper face 82 of the lug 60 will have been moved into a position where it is engaged by the surface 83 on the lever 58, the screw 80 moved within a few thousandths of an inch of the end of the lever 59, and the lug 77 on the lever 58 moved under the roller 103 on the associated lever 98 with the result that only a few thousandths of an inch play then exists between the lug 77 on the lever 58 and the associating roller 103, and between the lugs 77 on the locking levers at the opposite side of the change speed device and the rollers 103 and 102 at the same side of the change speed device.

With the lever 48 in shifted position and the associated parts in the positions last described, the levers 49, 50 and 51 are locked against movement to establish driving connections. As will readily be understood from the foregoing description, initial movement of the lever 49 in a direction to establish a driving connection will act to cam the lever 59 into engagement with the screw 80 carried by the lever 58, while initial movement of the levers 50 and 51 toward the positions to establish driving connections will act to move the lugs 77 on such levers into engagement with the rollers 102 and 103 on the arm 98 at that side of the change speed device, quickly taking up the few thousandths of an inch lost motion remaining and acting through the mechanism 94 to exert a downward pressure on the lever 58. The force communicated to the lever 58 through attempts to shift the levers 49, 50 and 51 will be communicated to the lever 48 in such a manner as not to cause rotation thereof, in consequence of the surfaces 82 and 83 being designed in the manner previously set forth.

Assuming that the lever 48 has been returned to an inoperative position and it is then desired to shift the lever 49 to connect the clutch 36 with the gear 23, movement of the lever 49 to effect such connection will act through the cam surface 65 to cam the locking lever 59 upward until the shoulder 63 slides under the outer end of the lever 59. During upward movement of the lever 59, the cam surface 78 carried by such lever will act through engagement with the roller 102 on the associated lever 98 to move such lever upward, and through the intermediate portion of the mechanism 94 to move the lever 98 on the opposite side of the change speed device downward. At the end of the shifting movement of the lever 49, the upper surface 84 of the shoulder 63 will have been moved into a position where it is engaged by the surface 85 on the lever 59, the end of the lever 59 moved within a few thousandths of an inch of the end of the screw 80 on the lever 58, and the lug 77 on the lever 59 moved under the roller 102 on the associated lever 98 with the result that only a few thousandths of an inch of play will then exist between the lug 77 on the lever 59 and the associated roller 102, and between the lugs 77 on the locking levers at the opposite side of the change speed device and the rollers 103 and 102 at that side of the change speed device.

At the termination of shifting movement of the lever 49, the levers 48, 50 and 51 will be locked against movement to establish driving connections. Under such condition, initial movement of the lever 48 in a direction to establish a driving connection will act to cam the lever 58 upward bringing the screw 80 into engagement with the lever 59, while initial movement of the levers 50 and 51 toward positions to establish driving connections will act to move the lugs 77 on such levers into engagement with the rollers 102 and 103 on the arm 98 at that side of the change speed device with a similar result to that set forth in connection with the lever 48. The force communicated to the lever 59 through attempts to shift the other shifting levers 48, 50 and 51 will be communicated to the lever 49 in such a manner as not to cause rotation thereof due to the design of the surfaces 84 and 85.

Assuming next that the lever 49 has been returned to an inoperative position and it is desired to shift the lever 50 to connect the clutch 30 with the gear 18, movement of such lever to effect the connection will act through the cam surface 72 to cam the locking lever 68 upward until the lug 70 slides under the outer end of the lever 68. During such movement the cam surface 78 on the lever 68 will act through engagement with the roller 102 on the associated lever 98 to move such lever upward, and through the mechanism 94 to move the lever 98 on the opposite side of the change speed device downward. At the end of the shifting movement of the lever 50 the upper face 86 of the lug 70 will have been moved under the surface 87 on the lever 68, the inner end of the lever 68 moved within a few thousandths of an inch of the end of the screw 80 carried by the lever 69 with the result that only a few thousandths of an inch play then exists between the lug 77 on the lever 68 and the associated roller 102, and between the lugs 77 on the locking levers 58 and 59 and the rollers 103 and 102 at the same side of the change speed device. With the lever 50 in shifted position, the levers 51, 49, and 48 will be locked against movement in a direction to establish driving connections. Under such condition, a very small movement of the lever 51 in a direction to establish a driving connection will act to cam the lever 69 upward a sufficient distance to move the screw 80 carried by such lever into engagement with the end of the lever 68, while small movements of the levers 49 and 48 towards positions to establish driving connections will act to move the lugs 77 on such levers into engagement with the rollers 102 and 103 on the arm 98 at that side of the change speed device, taking up the few thousandths of an inch lost motion remaining, and acting through the mechanism 94 to exert a downward pressure on the lever 68. The force communicated to the lever 68 through attempts to shift the levers 51, 49 and 48 will be communicated to the lever 50, as in the case of the levers 48 and 49, in such a manner as not to cause rotation thereof due to the design of the surfaces 86 and 87.

Assuming next that the lever 50 has been returned to an inoperative position and it is then desired to shift the lever 51 to move the clutch 33 into engagement with the gear 19, movement of the lever 51 to effect such connection will act through the cam surface 75 to cam the locking lever 69 upward until the lug 73 slides under the outer end of the lever 69. During upward movement of the lever 69, the cam surface 78 on such lever will act through engagement with the roller 103 on the associated lever 98 to move such lever upward, and through the intermediate portion of the mechanism 94 to move the lever 98 on the opposite side of the change speed device downward. At the end of the shifting movement of the lever 51, the upper surface 88 on the lug 73 will have been moved into a position where it is engaged by the surface 89 on the lever 69, the screw 80 moved within a few thousandths of an inch of the end of the lever 68, and the lug 77 on the lever 69 moved beneath the roller 103 on the associated lever 98 with the result that only a few thousandths of an inch play will then exist between the lug 77 on the lever 69 and the associated roller 103, and between the lugs 77 on the locking levers 58 and 59 and the rollers 103 and 102 at the same side of the change speed device. At the termination of the shifting movement of the lever 51, the levers 50, 48 and 49 will be locked against movement to establish driving connections. Under such condition, a small movement of the lever 50 in a direction to establish a driving connection will act to cam the lever 68 upward, moving the end of such lever into engagement with the screw 80 carried by the lever 69, while small movements of the levers 48 and 49 towards positions to establish driving connections will act to move the lugs 77 on such levers into engagement with the rollers 102 and 103 on the arm 98 at that side of the change speed device, taking up the few thousandths of an inch lost motion remaining, and acting through the mechanism 94 to exert a downward pressure on the lever 69. The force communicated to the lever 69 through attempts to shift the levers 50, 49 and 48 will be communicated to the lever 51, as in the case of the other shifting levers, in such a manner as not to cause rotation thereof due to the design of the surfaces 88 and 89.

From the foregoing description it will be perceived that the levers 58, 59, 68 and 69, together with the mechanism 94, make up a positive and effective interlock mechanism which prevents the establishment of more than one driving connection at a time.

What I claim as new is:

1. The combination in a shifting mechanism for a change speed device of the type which comprises sliding members for establishing and interrupting driving connections between the driving and driven parts, of pivotally mounted levers connected to the aforesaid sliding members and movable in spaced parallel planes on opposite sides of said mechanism and means actuated by the movement of said levers whereby the movement of any one of said levers to a position to effect a driving connection acts to lock the remaining levers against like movement, said means comprising a lost motion linkage mechanism extending across said device and interconnecting said levers so constructed that movement of any one of said levers in establishing a driving connection takes up the lost motion provided therein, and so constructed that the force communicated to the lever so moved in attempting to move any of the other levers to such position acts substantially radially with respect thereto.

2. The combination in a shifting mechanism for a change speed device of the type which comprises sliding members for establishing and interrupting driving connections between the driving and driven parts, of pivotally mounted levers connected to the aforesaid sliding members and means actuated by the movement of said levers whereby the movement of any one of said levers to a position to effect a driving connection acts to lock the remaining levers against like movement, said means comprising a cam on each of said levers, and mechanism including a separate pivoted follower arranged to engage with and to be actuated by each cam, means establishing lost motion connections between each follower and all the others, said cams and said follower mechanism being so constructed that movement of any one of said levers in establishing a driving connection takes up the lost motion provided in all of said connections, and so constructed that the force communicated to the lever so moved in attempting to move the other levers to such position acts substantially radially with respect thereto.

3. The combination in a shifting mechanism for a change speed device, of a pair of shifting levers for establishing and interrupting driving connections between the driving and driven parts of the change speed device, a pair of locking levers pivoted intermediate said shifting levers, means for communicating movement of one of said shifting levers to one of said locking levers, and means for communicating movement of the other of said shifting levers to the other of said locking levers, the arrangement being such that said locking levers are moved in opposite directions by corresponding movements of said shifting levers, and abutments on said locking levers arranged in such a manner that movement of either of said locking levers in response to movement of the associated shifting lever to establish a driving connection will move the abutment on such locking lever into close proximity to the abutment on the other locking lever to thereby block movement of such latter locking lever in response to movement of the shifting lever associated therewith.

4. The combination in a shifting mechanism for a change speed device, of a pair of shifting levers for establishing and interrupting driving connections between the driving and driven parts of the change speed device, a pair of locking levers, means for communicating movement of one of said shifting levers to one of said locking levers, and means for communicating movement of the other of said shifting levers to the other of said locking levers, the arrangement being such that said locking levers are moved in opposite directions by corresponding movements of said shifting levers, and abutments on said locking levers arranged in such a manner that movement of either of said locking levers in response to movement of the associated shifting lever to establish a driving connection will move the abutment on such locking lever into close proximity to the abutment on the other locking lever to thereby block movement of such latter locking lever in response to movement of the shifting lever associated therewith.

5. The combination in a shifting mechanism for a change speed device, of a pair of shifting levers for establishing and interrupting driving connections between the driving and driven parts of the change speed device, a pair of locking levers, means for communicating movement of one of said shifting levers to one of said locking levers, and means for communicating movement of the other of said shifting levers to the other of said locking levers, the arrangement being such that said locking levers are moved in opposite directions by corresponding movements of said shifting levers, and abutments on said locking levers arranged in such a manner that movement of either of said locking levers in response to movement of the associated shifting lever to establish a driving connection will move the abutment on such locking lever into close proximity to the abutment on the other locking lever to thereby block movement of such latter locking lever in response to movement of the shifting lever associated therewith, said means for communicating movement of said shifting levers to said locking levers including means which prevents turning movement of either of said shifting levers after being moved to effect a driving connection by the force transmitted to such lever by attempt to move the other shifting lever to a like position.

6. The combination with a change speed device, of a mechanism comprising a pair of shifting levers for establishing and interrupting driving connections between the driving and driven parts of the change speed device, a pair of locking levers, means for communicating movement of one of said shifting levers to one of said locking levers, and means for communicating movement of the other of said shifting levers to the other of said locking levers, the arrangement being such that said locking levers are moved in opposite directions by corresponding movements of said shifting levers, and abutments on said locking levers arranged in such a manner that movement of either of said locking levers in response to movement of the associated shifting lever to establish a driving connection will move the abutment on such locking lever into close proximity to the abutment on the other locking lever to thereby block movement of such latter locking lever in response to movement of the shifting lever associated therewith, a second mechanism at the opposite side of the change speed device from said first mentioned mechanism comprising corresponding elements, and a third mechanism extending across said change speed device comprising a pivoted member arranged for engagement with the aforesaid locking levers of said first named mechanism, and a second pivoted member connected to said first member and arranged for engagement with the locking levers of said second named mechanism, said third named mechanism being so coordinated with the locking levers of said other two mechanisms that movement of either one of the locking levers at either side of the change speed device in response to movement of the associated shifting lever to establish a driving connection will act through said third named mechanism to move the pivoted member at the opposite side of the change speed device into a position in which it will block movement of the locking levers at that side of the change speed device in response to movement of the associated shifting levers.

7. In a device of the character described a pair of pivoted shifter levers, each of which is provided with a cam surface having a dwell therein, a pair of locking levers pivoted intermediate said shifting levers and each having a cam surface engaging the cam surface on a shifter lever, and stops on the locking levers for engagement when the cam surface of either of the locking levers rides upon the dwell of the adjacent cam surface to block movement of the other shifter lever.

8. In a device of the character described a pair of shifter levers movable in spaced parallel planes, a cam element associated with each of said levers and having a dwell in the camming surface thereof, and a lost motion locking mechanism intermediate said shifter levers including a link movable at right angles to said planes, said locking mechanism having cam surfaces connected by said link for engagement with the aforesaid cam elements to take up the lost motion in the locking mechanism when a cam surface of the locking mechanism rides upon the dwell of the associated cam element, whereby movement of the other cam element is blocked.

JOHN HART WILSON.